Figure 2:
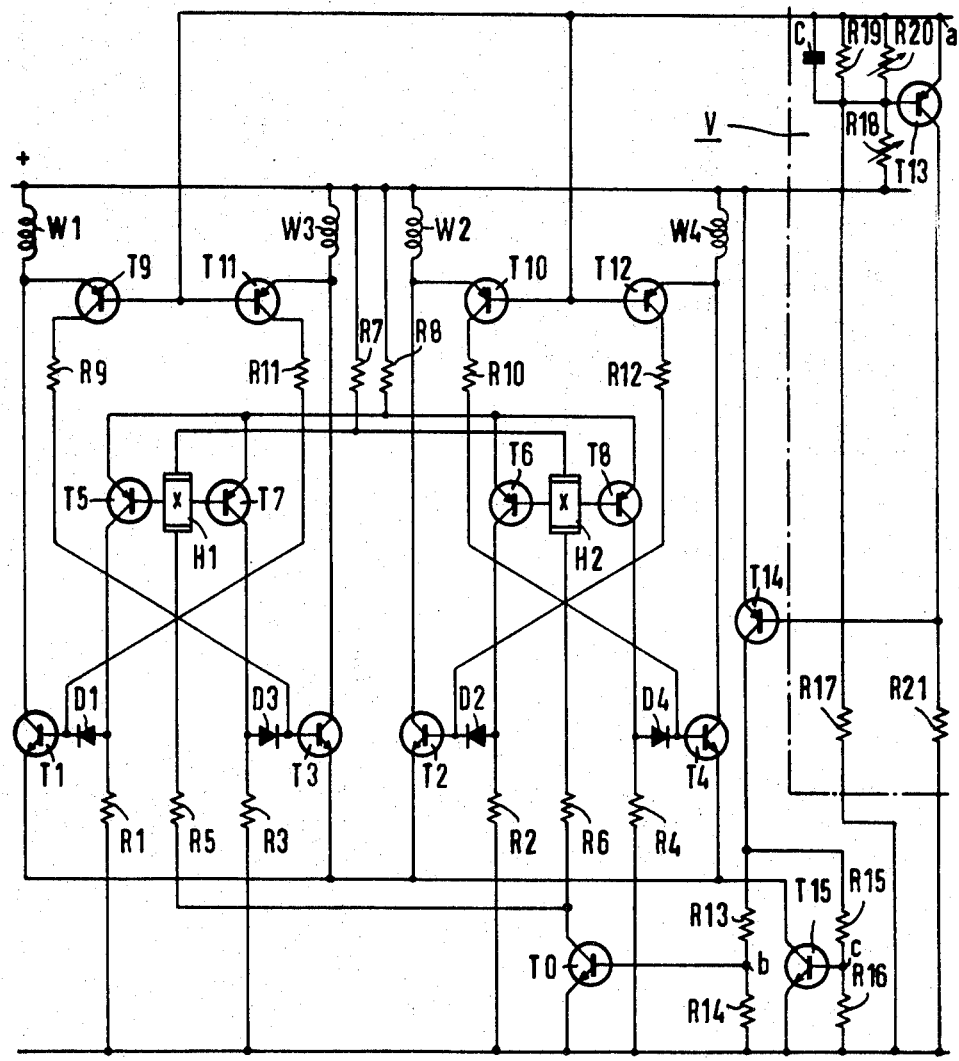

United States Patent [19]
Brunner

[11] 3,716,769
[45] Feb. 13, 1973

[54] BRUSHLESS D.C. MOTOR HAVING PERMANENT MAGNET ROTOR AND HALL EFFECT COMMUTATION INCLUDING SPEED CONTROL RESPONSIVE TO WINDING VOLTAGE

[75] Inventor: Julius Brunner, Nurnberg, Germany

[73] Assignee: Siemens Aktiengesellschaft, Berlin and Munchen, Germany

[22] Filed: Dec. 22, 1971

[21] Appl. No.: 210,635

[30] Foreign Application Priority Data

Dec. 23, 1970  Germany.....................P 20 63 351.6

[52] U.S. Cl. ..................318/254, 318/331, 318/138
[51] Int. Cl. ............................................H02k 29/00
[58] Field of Search.......318/153, 254, 345, 439, 331

[56] References Cited

UNITED STATES PATENTS 3,541,408  11/1970  Schwendtner et al................318/254
3,538,407  11/1970  Wenk...................................318/254

*Primary Examiner*—G. R. Simmons
*Attorney*—Arthur E. Wilfond et al.

[57] ABSTRACT

A brushless DC motor comprises switching means coupled to and controlled in condition by a comparator circuit. The control current terminals of a pair of Hall effect generators are connected to the negative polarity terminal of a DC voltage source through the switching means. The base electrodes of four coupling transistors are connected to each other. Each pair of coupling transistors are connected to a corresponding pair of the winding branches of the motor which are mutually displaced electrically by 180°. There are four power transistors. The collector electrode of each coupling transistor of a pair of coupling transistors is connected to the base electrode of the power transistor connected to the other of the corresponding pair of winding branches. A voltage proportional to the speed of rotation of the rotor at the emitter-base paths of the coupling transistors is provided at the winding branches.

4 Claims, 2 Drawing Figures ively connected to winding branches which are electrically
BRUSHLESS D.C. MOTOR HAVING PERMANENT MAGNET ROTOR AND HALL EFFECT COMMUTATION INCLUDING SPEED CONTROL RESPONSIVE TO WINDING VOLTAGE The present invention relates to a brushless DC motor. More particularly, the invention relates to a brushless DC motor having a permanent magnet rotor and Hall effect generator control.

The brushless DC motor of the invention has a stator winding comprising four winding branches mutually displaced electrically by 90°. The winding branches are Y-connected at one end and are connected directly to the positive polarity terminal of a DC voltage source. At its other end, each of the winding branches is connected via the collector-emitter path of a corresponding one of a plurality of power transistors to the negative polarity terminal of the DC voltage source. Each of a plurality of input transistors is associated with a corresponding one of the power transistors. The input transistors are of the opposite conductivity type from the power transistors. The collector electrode of each input transistor is connected to the base electrode of the associated power transistor, and via a collector resistor to the negative polarity terminal of the DC voltage source. The emitter electrode of each input transistor is connected via a common emitter resistor to the positive polarity terminal of the Dc voltage source. In each case, the base electrodes of two input transistors associated with the power transistors of two winding branches mutually displaced electrically by 180° are connected to the Hall voltage leads of a Hall effect generator associated with the winding branches in question. The control current terminals of the two Hall effect generators are connected to the terminals of the DC voltage source via resistors. A voltage proportional to the speed of rotation is derived from the winding branches by semiconductor elements connected to each other at one terminal lead, and such voltages are applied to a comparison circuit.

In such brushless DC motors, the control current for the Hall effect generators is continuously derived from the DC source. This is almost always without significance if such a motor is connected to a DC line and if the nominal motor current is large compared to the control current for the Hall effect generators. If, however, the control current of the Hall effect generators is of the magnitude of the nominal motor current, there is a considerable reduction in the motor efficiency, since the control current of Hall effect generators is included in the motor losses. Poor efficiency is particularly disadvantageous if the motor must be connected to a battery.

The invention is an improvement over a brushless DC motor of the type described in the journal "VDE-Fachberichte", No. 25 (1968), pages 147 to 151, FIG. 12.

An object of the invention is to provide a brushless DC motor of considerably improved efficiency.

Another object of the invention is to provide a brushless DC motor of reduced total motor current thereby having considerably improved efficiency.

In accordance with the invention, considerably improved efficiency is provided by connecting the control current terminals of the two Hall effect generators to the DC voltage source via switching means controlled by a comparison circuit. The voltage proportional to the speed of rotation is derived from the winding branches via the emitter-base paths of coupling transistors having their base electrodes connected to each other. The two coupling transistors are respectively connected to winding branches which are electrically displaced from each other by 180°. The collector electrode of each coupling transistor is connected to the base electrode of the power transistor associated with the respective other winding branch.

In accordance with another embodiment of the invention, the Hall effect generator control current is disconnected in a motor having a comparator circuit which comprises a comparison transistor in a simple manner by connecting the collector electrode of the comparison transistor to the base electrode of a control transistor. The emitter electrode of the control transistor is connected to the positive polarity terminal of the DC voltage source. The collector electrode of the control transistor is connected to the negative polarity terminal of the DC voltage source via a voltage divider. One of the electrodes of each Hall effect generator is connected via the collector-emitter path of a disconnect transistor to the negative polarity terminal of the DC voltage source. The base electrode of the disconnect transistor is connected to the tap point of a voltage divider which is connected to the negative polarity terminal of the DC voltage source.

In a DC motor having a control for the speed of rotation, the comparator circuit already available for the speed control may also be used advantageously for disconnecting the Hall effect generator control current. The emitter electrodes of the power transistors are connected via the collector-emitter path of a common control transistor to the negative polarity terminal of the DC voltage source. The base electrode of the control transistor is connected to the tap point of another voltage divider connected in shunt with the first-mentioned voltage divider.

In order to avoid problems with potential levels, it may be advisable to provide the common connections of the input and coupling transistors at the base electrodes of the power transistors. This is accomplished by always connecting the collector electrodes of the input transistors via respective decoupling diodes to the base electrodes of the associated power transistors.

The brushless DC motor of the invention has a permanent magnet rotor and Hall effect generator control. The motor is powered by a DC voltage source having a positive polarity terminal and a negative polarity terminal. The motor has a stator winding having four winding branches mutually displaced electrically by 90°. The winding branches have one end which is Y-connected and is connected directly to the positive polarity terminal of the DC voltage source and another end. Each of a plurality of power transistors has emitter, collector and base electrodes and a collector-emitter path. The other end of each of the winding branches is connected to the negative polarity terminal of the DC voltage source via the collector-emitter path of a corresponding one of the power transistors. Each of a plurality of input transistors of opposite conductivity type from the power transistors has emitter, collector and base electrodes. The collector electrode of each of the input transistors is connected to the base electrode of a corresponding one of the power transistors. The collector electrode of each of the input transistors is connected to the negative polarity terminal of the DC voltage source via a corresponding one of a plurality of first collector resistors. The emitter electrodes of the input transistors are connected to the positive polarity terminal of the DC voltage source via a common emitter resistor. Each of a pair of Hall effect generators has a pair of Hall voltage electrodes and a pair of control current electrodes. The base electrodes of two input transistors connected to the power transistors connected to two winding branches mutually displaced electrically by 180° are connected to the Hall voltage electrodes of a corresponding one of the Hall effect generators. The control current electrodes of the Hall effect generators are connected to the positive and negative polarity terminals of the DC voltage source via resistor means. Each of a plurality of coupling transistors has emitter, collector and base electrodes and an emitter-base path for deriving from the winding branches a voltage proportional to the speed of rotation of the rotor. The coupling transistors are connected to each other and to the positive polarity terminal of the DC voltage source. A comparator circuit is connected to the coupling transistors.

In accordance with the invention, a brushless motor comprises switching means coupled to and controlled in condition by the comparator circuit. Means connects the control current terminals of the Hall effect generators to the negative polarity terminal of the DC voltage source through the switching means. Means connects the base electrodes of the coupling transistors to each other. Means connects each pair of the coupling transistors to a corresponding pair of the winding branches which are mutually displaced electrically by 180°. Means connects the collector electrode of each coupling transistor of a pair of coupling transistors to the base electrode of the power transistor connected to the other of the corresponding pair of winding branches. The voltage proportional to the speed of rotation of the rotor at the emitter-base paths of the coupling transistors is provided at the winding branches.

The comparator circuit comprises a comparison transistor having emitter, collector and base electrodes. A first control transistor has emitter, collector and base electrodes. Means connects the collector electrode of the comparison transistor to the base electrode of the first control transistor. Means connects the emitter electrode of the first control transistor to the positive polarity terminal of the DC voltage source. Means connects the collector electrode of the first control transistor to the negative polarity terminal of the DC voltage source via a first voltage divider. The switching means comprises a disconnect transistor having emitter, collector and base electrodes and a collector-emitter path. Means connects the base electrode of the disconnect transistor to the tap point of the first voltage divider. The means connecting the control current terminals of the Hall effect generators to the DC voltage source through the switching means comprises means connecting one control current electrode of each of the Hall effect generators to the negative polarity terminal of the DC voltage source via the collector-emitter path of the disconnect transistor.

A second control transistor has emitter, collector and base electrodes and a collector-emitter path. A second voltage divider connected in parallel with the first voltage divider has a tap point connected to the base electrode of the second control transistor. Means connects the emitter electrodes of the power transistors in common to the negative polarity terminal of the DC voltage source via the collector-emitter path of the second control transistor.

The collector electrode of each of the input transistors is connected to the base electrode of the corresponding one of the power transistors via a corresponding one of a plurality of diodes.

Figure 1:
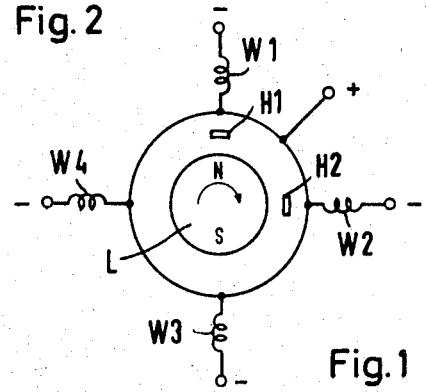

In order that the invention may be readily carried into effect, it will now be described with reference to the accompanying drawing, wherein:

FIG. 1 is a schematic diagram of an embodiment of the brushless DC motor of the invention, having Hall effect generators; and FIG. 2 is a circuit diagram of an embodiment of the brushless DC motor of the invention.

In FIGS. 1 and 2, the stator winding of a brushless DC motor has winding branches W1 to W4. The permanent magnet rotor L of the brushless DC motor has magnetic poles N and S. Two Hall effect generators H1 and H2 are arranged radially opposite and electrically displaced from each other by 90°.

At one of their ends, the winding branches W1 to W4 are Y-connected and are connected to the positive polarity terminal, or the first terminal, +, of a DC voltage source. At their other ends, each of the winding branches W1 to W4 is connected to the collector electrode of a corresponding one of power transistors T1 to T4.

The emitter electrodes of the power transistors are connected in common via the collector-emitter path of a common control transistor T15 to the negative polarity terminal, or the second terminal, −, of the DC voltage source.

As will further be seen from FIG. 2, the power transistors T1 to T4 are controlled via input transistors T5 to T8. To accomplish this, the base electrodes of input transistors T5 to T8, arranged in pairs T5, T7 and T6, T8, are connected to the Hall voltage electrodes of corresponding ones of Hall effect generators H1 and H2. Thus, the base electrode of each of the input transistors T5 and T7 is connected to a corresponding Hall voltage electrode of the Hall effect generator H1, and the base electrode of each of the input transistors T6 and T8 is connected to a corresponding Hall voltage electrode of the Hall effect generator H2.

The control current terminals of the Hall effect generators H1 and H2 are connected via a common resistor R7 to the first terminal + of the DC voltage source. The other control current terminals of the Hall effect generators H1 and H2 are connected via two separate resistors R5 and R6, and the collector-emitter path of a disconnect transistor TO connected in common and in series with the resistors R5 and R6, to the second terminal − of the DC voltage source.

The collector electrode of each of the input transistors T5 to T8 is connected to the base electrode of a corresponding or associated one of the power transistors T1 to T4, and via a corresponding one of first collector resistors R1 to R4 to the second terminal — of the Dc voltage source. The emitter electrodes of the input transistors T5 to T8 are connected via a common emitter resistor R8 to the first terminal + of the DC voltage source.

A corresponding one of coupling transistors T9 to T12 is connected to the end of each of the winding branches W1 to W4 which is connected to the corresponding one of the power transistors T1 to T4. The collector electrode of each of the coupling transistors T9 to T12 is connected to the base electrode of the power transistor T1 to T4 which is associated with the winding branch W1 to W4 displaced electrically by 180° from the winding branch connected to the respective coupling transistor via a corresponding one of second collector resistors R9 to R12.

Thus, the collector electrode of the coupling transistor T9, connected to the winding Branch W1, is connected to the base electrode of the power transistor T3 associated with the winding branch W3 and the collector electrode of the coupling transistor T11 is connected to the base electrode of the power transistor T1 associated with the winding branch W1. In a similar manner, the coupling transistors T10 and T12 connected to the winding branches W2 and W4 are connected with the base electrodes of the power transistors T4 and T2, respectively. In order to avoid problems with potential levels, the junction points of the input transistors T5 to T8 and the coupling transistors T9 to T12 with the base electrodes of the power transistors T1 to T4 are decoupled by decoupling diodes D1 to D4.

The base electrodes of the coupling transistors T9 to T12 are connected to each other at a common junction point 1. The emitter electrode of a comparison transistor T13 is also connected to the junction point a. An RC circuit, comprising a capacitor C, a fixed resistor R19 and a variable resistor R20, is connected between the base electrode of the comparison transistor T13 and the junction point a. The base electrode of the comparison transistor T13 is also connected via another adjustable resistor R18 to the first terminal + of the DC voltage source and is connected via another fixed resistor R17 to the second terminal — of the DC voltage source. The collector electrode of the comparison transistor T13 is connected via a third collector resistor R21 to the second terminal — of the DC voltage source. The comparison transistor T13 and the resistance elements described together comprise a comparison circuit V of the DC motor of the invention.

The DC motor of the invention further comprises a control transistor T14. The emitter electrode of the control transistor T14 is directly connected to the first terminal +0 of the DC voltage source. The base electrode of the control transistor T14 is directly connected to the collector electrode of the comparison transistor T13. The collector electrode of the control transistor T14 is connected to the second terminal — of the DC voltage source via a voltage divider comprising resistors R13 and R14. The common junction point or tap point b of the resistors R13 and R14 is connected to the base electrode of the disconnect transistor TO. Another voltage divider comprising resistors R15 and R16 is connected in parallel with the voltage divider R13 and R14. The common junction point or tap point c of resistors R15 and R16 is connected to the base electrode of the control transistor T15.

The DC motor of the present invention operates as follows. If the DC voltage is switched on by the operation of a switch (not shown in the FIGURES) the control transistor T14 is made conductive first since the comparison transistor T13 is still cut off, due to the absence of the coupled speed-proportional voltage. The collector and base electrodes of the control transistor T14 thus have a negative potential via the third collector resistor R21. The collector current of the control transistor T14 causes a voltage drop at the voltage dividers R13, R14 and R15, R16. The tap points b and c of the voltage dividers are therefore at positive potential with respect to the negative polarity terminal — of the DC voltage source. Therefore, the disconnect transistor TO, the base electrode of which is connected to the tap point b, and the control transistor T15, the base electrode of which is connected to the tap point c, are conducting.

The control current circuit of the Hall generators H1 and H2 is switched on by the disconnect transistor TO and the motor current circuit is switched on by the control transistor T15. Depending upon the instantaneous position of the permanent magnet rotor L, one of the input transistors T5 to T8 and, therefore, one of the power transistors T1 to T4, is made conductive via one of the Hall effect generators H1 and H2, so that one of the winding branches W1 to W4 carries current. The permanent magnet rotor L thus begins to rotate in the direction of the arrow shown in FIG. 1. At the assumed direction of rotation, the power transistors are controlled or energized in the order T1, T2, T3, T4.

The speed-proportional voltage induced in the winding branches W1 to W4 also increases with increasing rotor speed. The speed-proportional voltage is derived via the emitter-base path of the coupling transistors T9 to T12 and is applied to the emitter electrode of the comparison transistor T13. When the rotor L reaches a predetermined speed, the coupled-out speed-proportional voltage is finally so high that the potential at the emitter electrode of the comparison transistor T13 is positive with respect to its base potential. The comparison transistor T13 thus becomes conductive and its collector potential is accordingly increased.

The base potential of the control transistor T14 is also increased due to the conductivity of the comparison transistor T13 and is further regulated up. Through the accompanying reduction of the collector current of the control transistor T14, the potential at the tap point b of the voltage divider R13, R14 drops, so that the disconnect transistor TO is also throttled down. If the resistor R14 has the accordingly suitable resistance value, the potential at the tap point b at a given speed is below the base-emitter threshold value of the disconnect transistor TO, so that said transistor cuts off completely and disconnects the control current of the Hall effect generators. The control transistor T15 is also controlled downward via the voltage divider R15, R16 when the collector current of the control transistor T14 decreases, so that the motor current is correspondingly reduced. The resistors R15 and R16 of voltage divider R15, R16, however, have different resistance values from the resistors R13 and R14 of voltage divider R13, R14, so that the control transistor T15 does not yet cut off below the nominal speed of the motor. If, however, the speed increases beyond the nominal speed, the control transistor T15 is throttled down and the motor current is thereby turned off. The speed thus drops again to the nominal speed at which the control transistor T15 is turned on again.

As hereinbefore mentioned, the derived voltage increases in accordance with increasing speed, when the DC motor speeds up, so that the coupling transistors T9 to T12 are fully modulated and the coupled-out voltage is applied to the junction point $a$. With upward control, the coupling transistors T9 to T12 draw a collector current via the second collector resistors R9 to R12, by which the connected power transistors T1 to T4 are controlled.

The power transistors T1 to T4 are controlled by the collector currents of the coupling transistors T9 to T12 to the same extent as that to which the control current of the Hall effect generators H1, H2 is reduced by the disconnect transistor T0. The control current of the Hall effect generators H1 and H2 is finally turned off and the control of the power transistors T1 to T4 via the input transistors thereby becomes ineffective. Since the base electrodes of the coupling transistors T9 to T12 are connected to each other, that one of the coupling transistors is always made to conduct in whose corresponding winding branch W1 to W4 the highest voltage is induced. The power transistors T1 to T4 therefore continue to be addressed in the appropriate order.

In the DC motor of the invention, the Hall effect generator control is therefore effective only during starting up of the motor. When a given speed is reached, the Hall effect generator control is automatically disconnected and the total motor current is thereby reduced by the control current for the Hall effect generators. The current required by the coupling transistors T9 to T12 for the control of the power transistors T1 to T4 is substantially smaller than the control current of the Hall effect generators. There is thus a considerable improvement in the efficiency of the DC motor of the invention.

While the invention has been described by means of a specific example and in a specific embodiment, it should not be limited thereto, for obvious modifications will occur to those skilled in the art without departing from the spirit and scope of the invention.

I claim:

1. A brushless DC motor having a permanent magnet rotor and Hall effect generator control, said motor being powered by a DC voltage source having a first and a second terminal, the motor having a stator winding having four winding branches mutually displaced electrically by 90°, the winding branches having one end which is Y-connected and is connected directly to the first terminal of the DC voltage source and another end, a plurality of power transistors each having emitter, collector and base electrodes and a collector-emitter path, the other end of each of the winding branches being connected to the second terminal of the DC voltage source via the collector-emitter path of a corresponding one of the power transistors, a plurality of input transistors of opposite conductivity type from the power transistors and each having emitter, collector and base electrodes, the collector electrode of each of the input transistors being connected to the base electrode of a corresponding one of the power transistors, a plurality of first collector resistors, the collector electrode of each of the input transistors being connected to the second terminal of the DC voltage source via a corresponding one of the first collector resistors, a common emitter resistor, the emitter electrodes of the input transistors being connected to the first terminal of the DC voltage source via the common emitter resistor, a pair of Hall effect generators each having a pair of Hall voltage electrodes and a pair of control current electrodes, the base electrodes of two input transistors connected to the power transistors connected to two winding branches mutually displaced electrically by 180° being connected to the Hall voltage electrodes of a corresponding one of the Hall effect generators, resistor means, the control current electrodes of the Hall effect generator being connected to the first and second terminals of the DC voltage source via the resistor means, a plurality of coupling transistors each having emitter, collector and base electrodes and an emitter-base path for deriving from the winding branches a voltage proportional to the speed of rotation of the rotor, the coupling transistors being connected to each other and to the first terminal of the DC voltage source, and a comparator circuit connected to the coupling transistors, said brushless motor comprising switching means coupled to and controlled in condition by the comparator circuit; means connecting the control current terminals of the Hall effect generators to the second terminal of the DC voltage source through the switching means; means connecting the base electrodes of the coupling transistors to each other; means connecting each pair of the coupling transistors to a corresponding pair of the winding branches which are mutually displaced electrically by 180°; and means connecting the collector electrode of each coupling transistor of a pair of coupling transistors to the base electrode of the power transistor connected to the other of the corresponding pair of winding branches, the voltage proportional to the speed of rotation of the rotor at the emitter-base paths of the coupling transistors being provided at the winding branches.

2. A brushless DC motor as claimed in claim 1, wherein the comparator circuit comprises a comparison transistor having emitter, collector and base electrodes, and further comprising a first control transistor having emitter, collector and base electrodes, means connecting the collector electrode of the comparison transistor to the base electrode of the first control transistor, means connecting the emitter electrode of the first contron transistor to the firs terminal of the DC voltage source, a first voltage divider having a tap point, means connecting the collector electrode of the first control transistor to the second terminal of the DC voltage source via the first voltage divider, and wherein the switching means comprise a disconnect transistor having emitter, collector and base electrodes and a collector-emitter path, and means connecting the base electrode of the disconnect transistor to the tap point of the first voltage divider, and wherein the means connecting the control current terminals of the Hall effect generators to the DC voltage source through the switching means comprises means connecting one control current electrode of each of the Hall effect generators to the second terminal of the DC voltage source via the collector-emitter path of the disconnect transistor.

3. A brushless DC motor as claimed in claim 2, further comprising a second control transistor having emitter, collector and base electrodes and a collector-emitter path, a second voltage divider connected in parallel with the first voltage divider and having a tap point connected to the base electrode of the second control transistor, and means connecting the emitter electrodes of the power transistors in common to the second terminal of the DC voltage source via the collector-emitter path of the second control transistor.

4. A brushless Dc motor as claimed in claim 2, further comprising a plurality of diodes, and wherein the vollector electrode of each of the input transistors is connected to the base electrode of the corresponding one of the power transistors via a corresponding one of the diodes.

* * * * *